(12) United States Patent
Macready et al.

(10) Patent No.: US 9,396,440 B2
(45) Date of Patent: Jul. 19, 2016

(54) SYSTEMS AND METHODS FOR SOLVING COMBINATORIAL PROBLEMS

(71) Applicant: D-Wave Systems Inc., Burnaby (CA)

(72) Inventors: William G. Macready, West Vancouver (CA); Edward D. Dahl, Sudbury, MA (US)

(73) Assignee: D-WAVE SYSTEMS INC., Burnaby (CA)

( * ) Notice: Subject to any disclaimer, the term of this patent is extended or adjusted under 35 U.S.C. 154(b) by 387 days.

(21) Appl. No.: 13/796,949

(22) Filed: Mar. 12, 2013

(65) Prior Publication Data
US 2013/0282636 A1 Oct. 24, 2013

Related U.S. Application Data

(60) Provisional application No. 61/635,591, filed on Apr. 19, 2012.

(51) Int. Cl.
G06F 17/00 (2006.01)
G06N 99/00 (2010.01)
B82Y 10/00 (2011.01)
G06N 5/04 (2006.01)
G06N 5/00 (2006.01)

(52) U.S. Cl.
CPC .............. *G06N 99/002* (2013.01); *B82Y 10/00* (2013.01); *G06N 5/003* (2013.01); *G06N 5/04* (2013.01)

(58) Field of Classification Search
None
See application file for complete search history.

(56) References Cited

U.S. PATENT DOCUMENTS

| 7,135,701 B2 | 11/2006 | Amin et al. |
| 7,418,283 B2 | 8/2008 | Amin |
| 7,533,068 B2 | 5/2009 | Maassen van den Brink et al. |
| 7,843,209 B2 * | 11/2010 | Berkley ................. B82Y 10/00 326/7 |
| 7,876,248 B2 | 1/2011 | Berkley et al. |
| 8,008,942 B2 | 8/2011 | van den Brink et al. |
| 8,035,540 B2 | 10/2011 | Berkley et al. |
| 8,073,808 B2 | 12/2011 | Rose |
| 8,174,305 B2 | 5/2012 | Harris |
| 8,190,548 B2 | 5/2012 | Choi |

(Continued)

FOREIGN PATENT DOCUMENTS

WO 2012/064974 A2 5/2012

OTHER PUBLICATIONS

N-stage planar optical permutation network R. A. Spanke and V. E. Benes © 1987 Optical Society of America.*

(Continued)

*Primary Examiner* — Kakali Chaki
*Assistant Examiner* — Ababacar Seck
(74) *Attorney, Agent, or Firm* — Seed IP Law Group PLLC

(57) ABSTRACT

Systems and methods to solve combinatorial problems employ a permutation network which may be modeled after a sorting network where comparators are replaced by switches that controllably determine whether inputs are swapped or are left unchanged at the outputs. A quantum processor may be used to generate permutations by the permutation network by mapping the state of each switch in the network to the state of a respective qubit in the quantum processor. In this way, a quantum computation may explore all possible permutations simultaneously to identify a permutation that satisfies at least one solution criterion. The Travelling Salesman Problem is discussed as an example of a combinatorial problem that may be solved using these systems and methods.

19 Claims, 11 Drawing Sheets

(56) References Cited

U.S. PATENT DOCUMENTS

| | | | |
|---|---|---|---|
| 8,195,596 | B2 | 6/2012 | Rose et al. |
| 8,244,662 | B2 | 8/2012 | Coury et al. |
| 8,560,282 | B2 * | 10/2013 | Macready .............. B82Y 10/00 703/3 |
| 2008/0052055 | A1 | 2/2008 | Rose et al. |
| 2008/0176750 | A1 | 7/2008 | Rose et al. |
| 2009/0121215 | A1 | 5/2009 | Choi |
| 2011/0022820 | A1 | 1/2011 | Bunyk et al. |
| 2011/0231462 | A1 | 9/2011 | Macready et al. |

OTHER PUBLICATIONS

Solving the Sorting Network Problem Using Iterative Optimization with Evolved Hypermutations Jiri Kubalik GECCO'09, Jul. 8-12, 2009, Montréal, Québec, Canada. Copyright 2009 ACM 978-1-60558-325-9/09/07 . . . $5.00.*

N-stage planar optical permutation network 1987 R. A. Spanke and V. E. Benes.*

Random Routing and Concentration in Quantum Switching Networks Rahul Ratan, Doctor of Philosophy, 2008.*

Solving the Sorting Network Problem Using Iterative Optimization with Evolved Hypermutations—2009 Jirí Kubalík kubalik@labe.felk.cvut.cz.*

Novel Sorting Networkbased Architectures for Rank Order Filters—1994 Chaitali Chakrabarti and LiYu Wang.*

Amin, M.H.S., "Effect of Local Minima on Adiabatic Quantum Optimization," *Physical Review Letters* 100(130503):1-4, 2008.

Macready et al., "Quantum Processor Based Systems and Methods That Minimize an Objective Function," U.S. Appl. No. 13/806,404, filed Jul. 6, 2012, 178 pages.

* cited by examiner

SYSTEMS AND METHODS FOR SOLVING COMBINATORIAL PROBLEMS

BACKGROUND

Field

The present systems and methods generally relate to using sorting networks to generate permutations by a quantum processor for solving combinatorial problems.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s}|<1|dH_e/ds|0>|=\delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. No. 7,135,701 and U.S. Pat. No. 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an (sing spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor is any computer processor that is designed to leverage at least one quantum mechanical phenomenon (such as superposition, entanglement, tunneling, etc.) in the processing of quantum information. Many different designs for quantum processor hardware exist, including but not limited to: photonic quantum processors, superconducting quantum processors, nuclear magnetic resonance quantum processors, ion-trap quantum processors, topological quantum processors, quantum dot quantum processors, etc. Regardless of the specific hardware implementation, all quantum processors encode and manipulate quantum information in quantum mechanical objects or devices called quantum bits, or "qubits;" all quantum processors employ structures or devices for communicating information between qubits; and all quantum processors employ structures or devices for reading out a state of at least one qubit. The physical form of the qubits depends on the hardware employed in the quantum processors; e.g., photonic quantum processors employ photon-based qubits, superconducting quantum processors employ superconducting qubits, and so on.

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further detail and embodiments of exemplary quantum processors that may be used in conjunction with the present systems and methods are described in at least U.S. Pat. No. 7,533,068, U.S. Pat. No. 8,008,942, US Patent Publication 2008-0176750 (now U.S. Pat. No. 8,195, 596), US Patent Publication 2009-0121215 (now U.S. Pat. No. 8,190,548), and US Patent Publication 2011-0022820. A person of skill in the art will appreciate that the present systems and methods may be employed with these and other forms of quantum processors, including superconducting quantum processors, non-superconducting quantum processors, quantum processors designed to perform adiabatic quantum computation, quantum annealing, and/or other quantum computing algorithms including gate/circuit model quantum computing algorithms such as Shor's algorithm, Grover's search algorithm, and the like.

Programming a Quantum Processor

A quantum processor may interact with a digital computer and may be programmed and/or operated via instructions sent from the digital computer. However, the way in which the quantum processor is programmed, and how its operation is involved in an algorithm for solving a problem, may depend on many factors. As described in U.S. Provisional Patent Application Ser. No. 61/569,023, filed Dec. 9, 2011 and entitled "Systems and Methods for Interacting with Quantum Processors," (now U.S. Non-Provisional patent application Ser. No. 13/806,404) and in accordance with the present systems and methods, a quantum processor may be programmed and operated to determine a solution to a computational problem via at least two approaches: a direct mapping approach and a sampling approach.

Direct Mapping Approach

A problem may comprise a number of variables and, using the direct mapping approach to solve the problem, each variable may be mapped to and/or represented by at least one qubit in a quantum processor. The types of problems that may be solved by this approach, as well as the relative size and complexity of such problems, typically depend on many factors. Two such factors may include the number of qubits in the quantum processor and the connectivity between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative paths directly available to three other qubits, while in any particular application any number (i.e., 0, 1, 2, or 3) of those communicative paths may be employed. In a quantum processor employing coupling devices between qubits, this would mean a qubit having a connectivity of three is communicably directly coupleable to three other quits via three respective coupling devices. In general, the number of qubits in a quantum processor limits the size of problems that may be solved and the connectivity between the qubits in a quantum processor limits the complexity of the problems that may be solved.

Examples of applications that employ the direct mapping approach include: US Patent Publication 2008-0052055, which describes solving a protein folding problem by first casting the protein folding problem as an Ising spin glass problem and then directly mapping the Ising spin glass problem to a quantum processor; U.S. Pat. No. 8,073,808, which describes solving a computational problem (e.g., an image-matching problem) by first casting the problem as a quadratic unconstrained binary optimization ("QUBO") problem and then mapping the QUBO problem directly to a quantum processor; and US Patent Publication 2011-0231462, which describes solving logic circuit representations of computational problems by mapping each individual logic gate to a respective miniature optimization problem having an output that is "optimized" if the truth table of the logic gate is satisfied. In all of these examples, a problem is solved by first casting the problem in a contrived formulation (e.g., Ising spin glass, QUBO, etc.) because that particular formulation maps directly to the particular embodiment of the quantum processor. In other words, an intermediate formulation is used to re-cast the original problem into a form that accommodates the number of qubits and/or connectivity constraints in the particular quantum processor.

Techniques for performing direct mapping of a problem to a quantum processor (e.g., techniques generating for generating an intermediate formulation, such as a QUBO problem) are described in at least U.S. Pat. No. 7,418,283, U.S. Pat. No. 7,135,701, U.S. Pat. No. 7,788,192, U.S. Pat. No. 7,533,068, U.S. Pat. No. 8,008,942, U.S. Pat. No. 7,984,012, US Patent Publication 2011-0238607 (now U.S. Pat. No. 8,244,662), US Patent Publication 2009-0121215 (now U.S. Pat. No. 8,190,548), US Patent Publication 2011-0018612 (now U.S. Pat. No. 8,174,305), and US Patent Publication 2011-0231462.

The "direct mapping" approach of re-casting a problem in an intermediate formulation can work well for some problems but can also be impractical for other problems. For example, casting a computational problem as a QUBO problem requires casting the computational problem in a form allowing only pair-wise interactions between qubits. Any higher-order interactions need to be broken down into pair-wise terms in order to be re-cast in QUBO form. Many computational problems have higher-order (i.e., beyond pair-wise) interactions between variables, and these problems can require significant pre-processing in order to be re-cast in QUBO form. Furthermore, breaking down higher-order interactions into pair-wise terms can force multiple qubits to be used to represent the same variable, meaning the size of the problem that can be solved is reduced. It is for at least these reasons that the alternative "sampling approach" to programming quantum processors has been developed.

Sampling Approach

The sampling approach to programming a quantum processor is described in U.S. Provisional Patent Application Ser. No. 61/505,044, filed Jul. 6, 2011 and entitled "Applications of Hardware Boltzmann Fits," U.S. Provisional Patent Application Ser. No. 61/515,742, filed Aug. 5, 2011 and entitled "Applications of Hardware Boltzmann Fits," U.S. Provisional Patent Application Ser. No. 61/540,208, filed Sep. 28, 2011 and entitled "Applications of Hardware Boltzmann Fits," U.S. Provisional Patent Application Ser. No. 61/550,275, filed Oct. 21, 2011 and entitled "Systems and Methods for Minimizing an Objective Function," U.S. Provisional Patent Application Ser. No. 61/557,783, filed Nov. 9, 2011 and entitled "Systems and Methods for Minimizing an Objective Function," U.S. Provisional Patent Application Ser. No. 61/636,308, filed Apr. 20, 2012 and entitled "Systems and Methods for Minimizing an Objective Function," U.S. Provisional Patent Application Ser. No. 61/666,545, filed Jun. 29, 2012 and entitled "Quantum Processor Based Systems and Methods that Minimize an Objective Function" (collectively, now U.S. Non-Provisional patent application Ser. No. 13/806,404, which is incorporated herein by reference in its entirety).

In brief, the sampling approach to programming a quantum processor involves using a digital computer to define an objective function which takes, as input, a bit string (i.e., a sequence of 0s and 1s) and outputs a real number. The quantum processor is called to provide a set of bit strings, or "samples," where each bit in the bit string corresponds to the state of at least one qubit in the quantum processor after a quantum computation/operation/algorithm is performed. The quality of each sample is then assessed by plugging it into the objective function on the digital computer to determine the corresponding real number output. The quantum processor intrinsically provides samples from a probability distribution, where the shape of the probability distribution depends on a configuration of programmable parameters (i.e., the same programmable parameters that are used to define a QUBO in the direct mapping approach). High probability samples in the quantum processor's probability distribution may correspond to low-energy states of the quantum processor. In other words, the quantum processor may intrinsically tend to provide samples from low-energy states (e.g., by performing adiabatic quantum computation and/or quantum annealing). The focus of the sampling approach to programming a quantum processor is to make these low-energy states of the quantum processor correspond to bit strings that produce desirable real number outputs in the objective function. This may be achieved by shaping the probability distribution of the quantum processor so that high-probability samples (e.g., low-energy states) correspond to bit strings that produce desirable real number outputs from the objective function. Thus, after the first samples from the quantum processor are assessed by determining their corresponding real number outputs, the programmable parameters of the quantum processor may be adjusted to re-shape the probability distribution of the quantum processor and increase the probability of producing desirable real number outputs and/or increase the desirability of at least some of the real number outputs produced.

Compared to the direct mapping approach, the sampling approach to programming a quantum processor is less dependent on the architecture of the processor itself and may enable a broader range of problems to be solved. In many applications, it can also be considerably more straightforward to program a quantum processor via the sampling approach than via the direct mapping approach.

Sorting Networks

A sorting network is an implementation of a mathematical model that is used to sort a set of inputs. For example, a sorting network may be used to arrange a set of numbers in either increasing or decreasing order. Many different such networks have been developed, but in general each network includes a set of inputs, a set of outputs, and a configuration of data flow lines (e.g., "wires") and comparators that connect the inputs to the outputs. Each comparator receives two wires as inputs and provides two wires as outputs. The role of the comparator is to compare the relative values of the two inputs and to output the smaller value on one output wire and the larger value on the other output wire. In sorting networks, the sequence of comparisons is "hard-coded" into the network and independent of the outcome of each comparison.

A sorting network may be physically implemented as a real circuit employing physical data flow lines (e.g., physical wires) and comparators, but more typically the network is implemented as a software algorithm where the "wires" and "comparators" are used for illustrative purposes to display the operation of the algorithm. Throughout this specification and the appended claims and unless the specific context requires otherwise, the term "wire" is used to generally describe a data flow line that illustrates data flow and connections in a software algorithm.

FIG. 1 is a schematic diagram of an exemplary sorting network 100 including six inputs 101a-101f and six outputs 110a-110f. Each input 101a-101f is directly connected to a corresponding output 110a-110f through a respective wire 120a-120f. For example, input 101a is directly connected to output 110a through wire 120a, and input 101d is directly connected to output 110d through wire 120d. However, sorting network 100 also includes a set of comparators 130a-130o, each of which receives two wires as inputs and provides two wires as outputs. Even though a respective wire directly connects each input to a corresponding output, the configuration of comparators 130a-130o affects the path each input follows through the network and, ultimately, determines the output to which each input will be routed. Throughout this specification and the appended claims, the term "path" is used to describe the route a given input takes through a sorting network. Thus, a "path" is made up of a specific input wire, a set of comparators that depends on the magnitude of the input (compared to the magnitudes of the other inputs), sections of wires corresponding to the outputs and inputs of successive comparators, and a specific output wire.

FIG. 2 is a schematic diagram of an exemplary sorting network 200, which is the same as sorting network 100 from FIG. 1, showing paths 241 and 242 taken by inputs 201b and 201d through the network, respectively. Network 200 receives 6 random numbers and sort them in increasing order, with the smallest number corresponding to the topmost output and the largest number corresponding to the bottommost output. As shown in FIG. 2, the inputs to network 200 are the numbers 1-6, arranged such that "4" corresponds to input 201b and "6" corresponds to input 201d. The "4" follows path 241 through network 200 and the "6" follows path 242 through network 200. Path 241 followed by the "4" comprises, in sequence:

Input 201b;

A section of wire 220b;

Comparator 230a, where the "4" is compared to a "5" and, since the "5" is positioned above the "4," the two are swapped;

A section of wire 220a;

Comparator 230f, where the "4" is compared to a "1" and, since the "1" is positioned below the "4," the two are swapped;

A section of wire 220b;

Comparator 230g, where the "4" is again compared to the "5" and, since the "5" is now positioned below the "4," the two are not swapped;

A section of wire 220b;

Comparator 230j, where the "4" is again compared to the "1" and, since the "1" is now positioned above the "4," the two are not swapped;

A section of wire 220*b*;

Comparator 230*k*, where the "4" is compared to a "3" and, since the "3" is positioned below the "4," the two are swapped;

A section of wire 220*c*;

Comparator 230*l*, where the "4" is compared to a "2" and, since the "2" is positioned below the "4," the two are swapped;

A section of wire 220*d*; and

Output 210*d*.

Path 242 followed by the "6" comprises, in sequence:

Input 201*d*;

A section of wire 220*d*;

Comparator 230*c*, where the "6" is compared to a "5" and, since the "5" is positioned above the "6," the two are not swapped;

A section of wire 220*d*;

Comparator 230*d*, where the "6" is compared to a "3" and, since the "3" is positioned below the "6," the two are swapped;

A section of wire 220*e*;

Comparator 230*e*, where the "6" is compared to a "2" and, since the "2" is positioned below the "6," the two are swapped;

A section of wire 220*f*; and

Output 210*e*.

A person of skill in the art will appreciate that paths 241 and 242 are applicable to the specific configuration of comparators in network 200 and the specific arrangement of inputs. The actual path taken by any given input in a sorting network depends on many factors and will vary for different input values/arrangements and different comparator configurations.

Sorting networks 100 and 200 from FIGS. 1 and 2, respectively, employ the same configuration of comparators and are known as "bubble sorting networks." As previously described, the bubble sorting network may be physically implemented as a real circuit employing physical wires and comparators, but more typically the network is implemented as a software algorithm where the "wires" and "comparators" are used for illustrative purposes to display the operation of the algorithm. For example, a pseudocode implementation of the bubble sorting network is:

```
procedure bubbleSort( A : list of sortable items )
    repeat
        swapped = false
        for i = 1 to length(A) - 1 inclusive do:
            if A[i-1] > A[i] then
                swap( A[i-1], A[i] )
                swapped = true
            end if
        end for
    until not swapped
end procedure
```

[Source: wikipedia.org/wiki/Bubble_sort; accessed Apr. 16, 2012]

The bubble sorting network used in FIGS. 1 and 2 is just one example of a sorting network, while in the art many alternative examples have been developed. For example, the bubble sorting network also works if it is operated in reverse, in which case it is known as an "insertion sort network."

FIG. 3A is a schematic diagram of an example of an insertion sorting network 300*a*, which uses the same comparators employed by the bubble sorting network but in the reverse order. Both the insertion sorting network 300*a* and the bubble sorting network 100 employ the same number of comparators and the same total number of steps (e.g., for six inputs: fifteen comparators performed in a series of fifteen steps); however, other sorting networks have been developed that may be preferable in specific applications. For example, some sorting networks employ steps that include multiple parallel comparisons and thereby reduce the total number of steps in the algorithm and/or some sorting networks may be designed to reduce the number of comparators required for a given number of inputs.

FIG. 3B is a schematic diagram of an example of a Bose-Nelson sorting network 300*b* that employs parallel comparators. Other examples of sorting network include the bitonic sorting network and Batcher's merge-exchange sorting network.

FIGS. 3C and 3D provide schematic diagrams of an exemplary bitonic sorting network 300*c* and an exemplary Batcher's merge-exchange sorting network 300*d*, respectively, each of which employs eight inputs. A person of skill in the art will appreciate that many other sorting networks are known (such as the Hibbard sorting network, the Batcher odd-even mergesort sorting network, etc.) and that many more sorting networks may still be developed. Accordingly, unless the specific context requires otherwise, the term "sorting network" is used throughout this specification and the appended claims to generally describe any network having inputs, outputs, wires, and comparators that is designed to provide at least partially sorted outputs. The bubble sorting network, insertion sorting network, Bose-Nelson sorting network, bitonic sorting network, Batcher's merge-exchange sorting network, Hibbard sorting network, and Batcher odd-even mergesort sorting network are used herein only as illustrative examples of sorting networks and are not intended to limit the scope of the present systems and methods to implementations that employ these specific sorting networks.

BRIEF SUMMARY

A method of operation of a computational solver system to solve a problem, where the computational solver system includes a digital computer may be summarized as including defining a permutation network by the digital computer, wherein the permutation network comprises a number of inputs, a number of outputs, a set of switches, and a set of paths, and wherein each path maps a respective input to a respective output through a respective combination of switches; generating a permutation by the permutation network, wherein the permutation corresponds to a configuration of the switches that produces an arrangement of the outputs; determining a characteristic of the permutation by the digital computer; evaluating the characteristic of the permutation against a set of at least one solution criterion by the digital computer; and in response to the characteristic of the permutation not satisfying the set of at least one solution criterion, repeating the generating a permutation, determining a characteristic of the permutation, and evaluating the characteristic of the permutation until the set of at least one solution criterion is satisfied. The computational solver system may further include a quantum processor, and generating a permutation by the permutation network may include mapping the permutation network from the digital computer to the quantum processor; and generating a permutation by the quantum processor. The quantum processor may include a programming subsystem and an evolution subsystem, and mapping the permutation network from the digital computer to the quantum processor may include programming the quantum processor with an objective function by the programming subsystem, wherein the objective function assigns a respective energy to each configuration of switches in the permutation network. Generating a permutation by the quantum processor may include evolving the quantum processor by the evolution subsystem to determine a configuration of switches in the permutation network. Evolving the quantum processor by the evolution subsystem to determine a configuration of switches in the permutation network may include evolving the quantum processor by the evolution subsystem to determine a specific configuration of switches in the permutation network that corresponds to a low-value of the objective function. Evolving the quantum processor by the evolution subsystem to determine a specific configuration of switches in the permutation network that corresponds to a low-value of the objective function may include evolving the quantum processor by the evolution subsystem to determine a specific configuration of switches in the permutation network that corresponds to a ground state value of the objective function. Evolving the quantum processor by the evolution subsystem to determine a configuration of switches in the permutation network may include performing at least one of adiabatic quantum computation and/or quantum annealing by the quantum processor. The quantum processor may include a plurality of qubits, programming the quantum processor with an objective function by the programming subsystem may include programming the quantum processor with an objective function that maps a state of each switch in the permutation network to a state of at least one corresponding qubit in the plurality of qubits by the programming subsystem, and generating a permutation by the quantum processor may include reading out a state of each qubit in the plurality of qubits by a read-out subsystem. Repeating the generating a permutation, determining a characteristic of the permutation, and evaluating the characteristic of the permutation until the set of at least one solution criterion is satisfied may include iteratively shaping a probability distribution of the quantum processor until a permutation that satisfies the set of at least one solution criterion is found. Programming the quantum processor with an objective function by the programming subsystem may include programming the quantum processor with an objective function that defines a respective miniature optimization problem corresponding to each switch in the permutation network, by the programming subsystem.

The problem may include a combinatorial problem, such as a combinatorial optimization problem. The combinatorial optimization problem may include an objective function and determining a characteristic of the permutation by the digital computer may include determining a value of the objective function that corresponds to the permutation by the digital computer. Evaluating the characteristic of the permutation against a set of at least one solution criterion by the digital computer may include evaluating whether or not the value of the objective function that corresponds to the permutation satisfies the set of at least one solution criterion by the digital computer. Evaluating whether or not the value of the objective function that corresponds to the permutation satisfies the set of at least one solution criterion by the digital computer may include evaluating whether or not the value of the objective function that corresponds to the permutation satisfies at least one of: a minimum allowed value, a maximum allowed value, a minimum allowed computation time, a maximum allowed computation time, a minimum allowed number of iterations, or a maximum allowed number of iterations.

Defining a permutation network by the digital computer may include: defining a sorting network by the digital computer, wherein the sorting network comprises a number of inputs, a number of outputs, a set of comparators, and a set of paths, and wherein each path maps a respective input to a respective output through a respective combination of comparators such that each input respectively maps to each of the outputs through a respective path; and programmatically replacing each comparator in the set of comparators with a respective switch by the digital computer. The sorting network may include at least one of: a bubble sorting network, an insertion sorting network, a bitonic sorting network, a Batcher's merge-exchange sorting network, a Bose-Nelson sorting network, a Hibbard sorting network, or a Batcher odd-even mergesort sorting network.

Defining a permutation network by the digital computer may include defining a permutation network wherein the number of outputs is greater than the number of inputs by the digital computer. Generating a permutation by the permutation network may include mapping each input to a respective output by the permutation network. Mapping each input to a respective output by the permutation network may include determining a configuration of the switches of the permutation that maps each input to a respective output.

Each input may be selectively mappable to each of the outputs through a respective path.

A computational solver system for solving problems may be summarized as including a digital computer that: defines a permutation network for generating permutations by a permutation network definition module, wherein the permutation network comprises a number of inputs, a number of outputs, a set of switches, and a set of paths, and wherein each path maps a respective input to a respective output through a respective combination of switches such that each input respectively maps to each of the outputs through a respective path; determines a characteristic of each permutation generated by the permutation network by a characteristic determination module; and evaluates the characteristic of the permutation against a set of at least one solution criterion by an evaluation module; and a quantum processor in communication with the digital computer, wherein the quantum processor generates permutations by the permutation network, and wherein each permutation corresponds to a configuration of the switches that produces an arrangement of the outputs. The quantum processor may include a superconducting quantum processor comprising superconducting qubits. The quantum processor may include at least one of a processor that performs adiabatic quantum computation and/or a processor that performs quantum annealing. The quantum processor may include a plurality of qubits; a programming subsystem that programs the quantum processor with an objective function that assigns a respective energy to each configuration of switches in the permutation network; an evolution subsystem that evolves the quantum processor to determine a configuration of switches in the permutation network; and a read-out subsystem that reads out a state of each qubit in the plurality of qubits.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
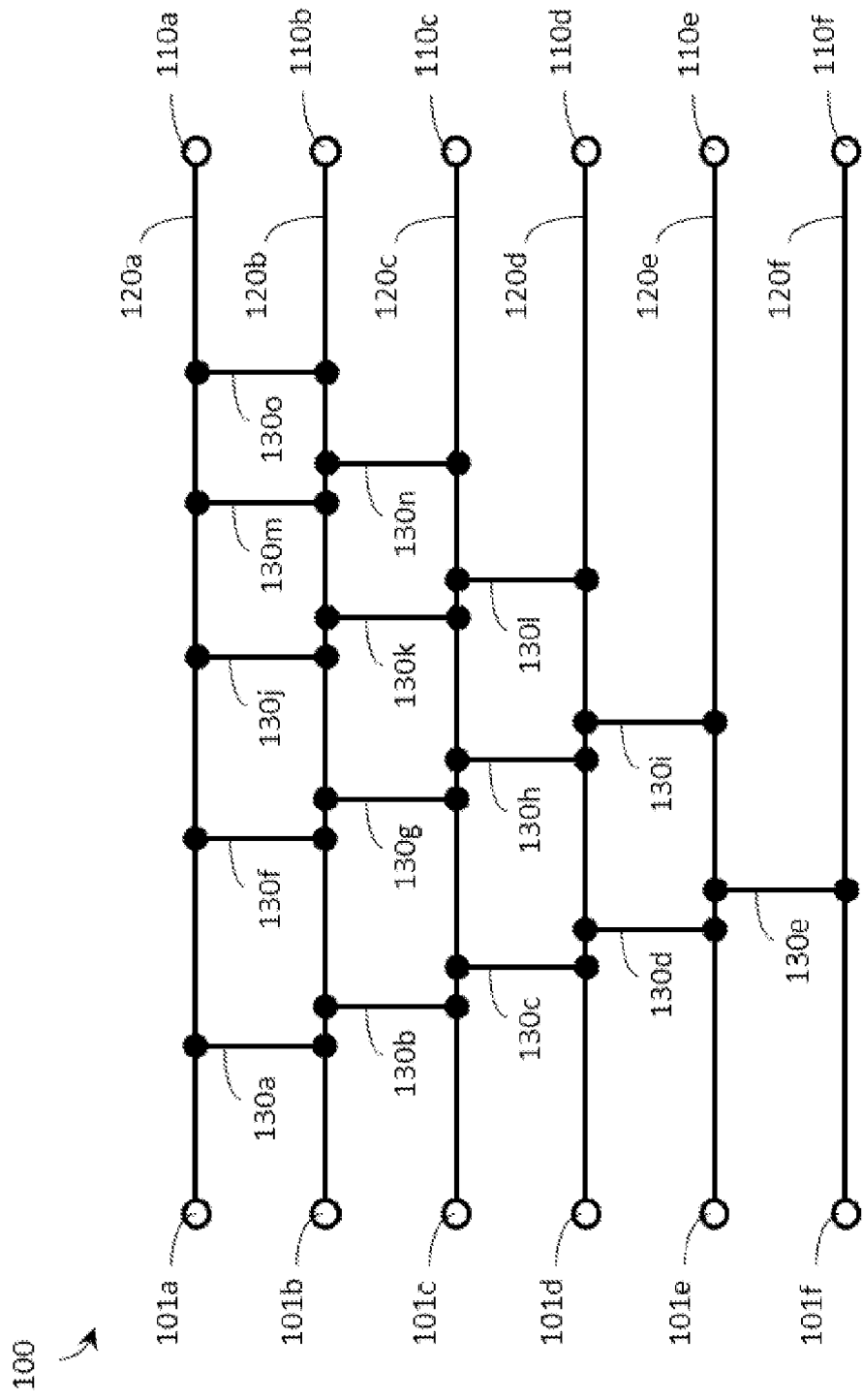
FIG. 1 is a schematic diagram of an exemplary bubble sorting network including six inputs and six outputs.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for solving combinatorial problems. More specifically, the various embodiments described herein provide systems and methods for formulating a combinatorial problem in a way that is amenable to being programmed into a quantum processor. The present systems and methods are particularly well-suited for use in conjunction with the sampling approach to programming a quantum processor described above, though a person of skill in the art will appreciate that the teachings herein may also be applied in conjunction with other methods of programming a quantum processor, including but not limited to the direct mapping approach.

Throughout this specification and the appended claims, the term "digital computer" is used to denote any "classical" (i.e., "non-quantum" in the sense that it does not make direct use of quantum phenomena, such as superposition and/or entanglement, in the processing of quantum information) computing or information processing system. An exemplary digital computer employs at least one classical digital microprocessor (e.g., an Intel Pentium® processor such as an Intel i7 quad Core® processor, Intel Atom® processor, ARM Cortex® CPU, etc.), field programmable gate array (FPGA), Application Specific Integrated Circuit (ASIC) or graphical processor unit (GPU, e.g., Nvidia GPU), or any number and/or combination of such processors.

Figure 4:
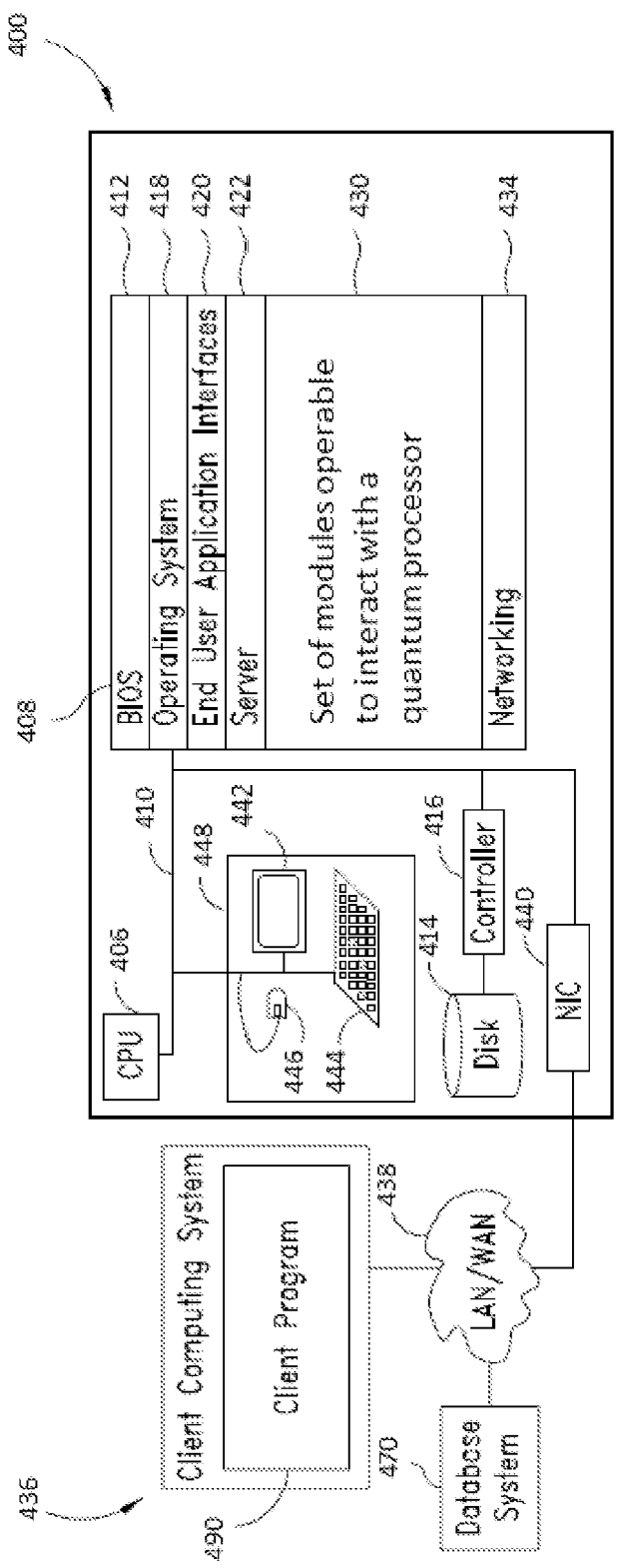
FIG. 4 is a schematic diagram of an exemplary digital computer that may be used in conjunction with the present systems and methods.

FIG. 4 illustrates an exemplary digital computer 400 including a digital processor 406 that may be used to perform digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. The present systems and methods can also be practiced in distributed computing environments, where tasks or modules are performed by remote processing devices, which are linked through a communications network. In a distributed computing environment, program modules may be located in both local and remote memory storage devices.

Digital computer 400 may include at least one processing unit 406 (i.e., digital processor), at least one system memory 408, and at least one system bus 410 that couples various system components, including system memory 408 to digital processor 406. Digital computer 400 will at times be referred to in the singular herein, but this is not intended to limit the application to a single digital computer 400. For example, there may be more than one digital computer 400 or other classical computing device involved throughout the present systems and methods Digital processor 406 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 4 are of conventional design. As a result, such blocks need not be described in further detail herein, as they will be understood by those skilled in the relevant art.

System bus 410 can employ any known bus structures or architectures, including a memory bus with a memory controller, a peripheral bus, and a local bus. System memory 408 may include read-only memory ("ROM") and random access memory ("RAM") (not shown). A basic input/output system ("BIOS") 412, which can form part of the ROM, contains basic routines that help transfer information between elements within digital computer 400, such as during startup.

Digital computer 400 may also include non-volatile memory 414. Non-volatile memory 414 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 414 may communicate with digital processor 406 via system bus 410 and may include appropriate interfaces or controllers 416 coupled between non-volatile memory 414 and system bus 410. Non-volatile memory 414 may serve as long-term storage for computer-readable instructions, data structures, program modules and other data for digital computer 400. Although digital computer 400 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various program modules, application programs and/or data can be stored in system memory 408. For example, system memory 408 may store an operating system 418, end user application interfaces 420 and server applications 422. In accordance with the present systems and methods, system memory 408 may store at set of modules 430 operable to interact with a quantum processor (not shown).

System memory 408 may also include one or more networking applications 450, for example, a Web server application and/or Web client or browser application for permitting digital computer 400 to exchange data with sources via the Internet, corporate Intranets, or other networks, as well as with other server applications executing on server computers. Networking application 450 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 4 as being stored in system memory 408, operating system 418 and various applications/modules 420, 422, 430, 450 and other data can also be stored in nonvolatile memory 414.

Digital computer 400 can operate in a networking environment using logical connections to at least one client computer system 436 and at least one database system 470. These logical connections may be formed using any means of digital communication, for example, through a network 438, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 400 may be connected to the LAN through an adapter or network interface card ("NIC") 440 (communicatively linked to system bus 410). When used in a WAN networking environment, digital computer 400 may include an interface and modem (not shown), or a device such as NIC 440, for establishing communications over the WAN. Non-networked communications may additionally, or alternatively be employed.

In a networked environment, program modules, application programs, data, or portions thereof can be stored outside of digital computer 400. Those skilled in the relevant art will recognize that the logical connections shown in FIG. 4 are only some examples of establishing communications between computers, and other connections may also be used.

While digital computer 400 may generally operate automatically, an end user application interface 420 may also be provided such that an operator can interact with digital computer 400 through different user interfaces 448, including output devices, such as a monitor 442, and input devices, such as a keyboard 444 and a pointing device (e.g., mouse 446). Monitor 442 may be coupled to system bus 410 via a video interface, such as a video adapter (not shown). Digital computer 400 can also include other output devices, such as speakers, printers, etc. Other input devices can also be used, including a microphone, joystick, scanner, etc. These input devices may be coupled to digital processor 406 via a serial port interface that couples to system bus 410, a parallel port, a game port, a wireless interface, a universal serial bus ("USB") interface, or via other interfaces.

NIC 440 may include appropriate hardware and/or software for interfacing with the elements of a quantum processor (not shown). In other embodiments, different hardware may be used to facilitate communications between digital computer 400 and a quantum processor.

Client computer system 436 may comprise any of a variety of computing devices communicatively coupled to digital computer 400, and may include a client program 490 configured to properly format and send problems directly or indirectly to server application 422. Once digital computer 400 has determined a solution, server application 422 may be configured to send information indicative of this solution back to client program 490.

In accordance with the present systems and methods, a digital computer (e.g., digital computer 400) may be used to interact with a quantum processor. A quantum processor may include a number of programmable elements, and interacting with a quantum processor may include programming the quantum processor with a particular problem formulation and/or programming configuration by assigning specific values to these programmable elements. Interacting with a quantum processor may also include evolving the quantum processor to determine a solution to the particular problem and reading out the solution from the quantum processor.

For example, a quantum processor may be designed to perform adiabatic quantum computation and/or quantum annealing. As previously discussed, a typical adiabatic evolution may be represented by equation 1:

$$H_e = (1-s)H_{In} + sH_f \quad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", PRL 100, 130503 (2008), is to start with an initial Hamiltonian of the form shown in equation 2:

$$H_{In} = -\frac{1}{2}\sum_{i=1}^{N} \Delta_i \sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N} h_i \sigma_i^z + \sum_{i,j=1}^{N} J_{ij}\sigma_i^z\sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields coupled into each qubit, and $\epsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in equations 2 and 3, respectively, may be physically realized in a variety of different ways. A particular example is realized by an implementation of superconducting qubits.

Figure 5:
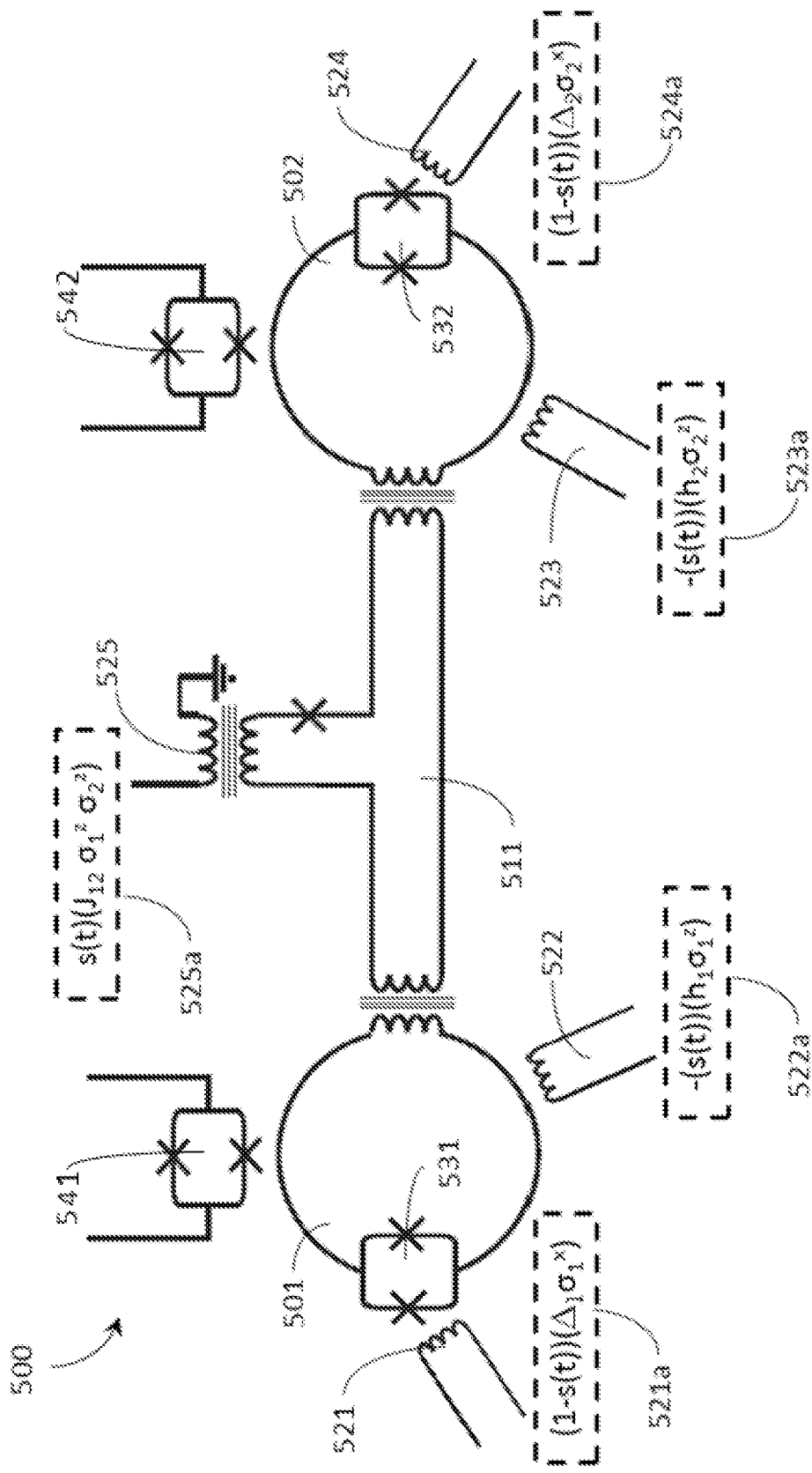
FIG. 5 is a schematic diagram of a portion of a superconducting quantum processor designed for AQC and/or quantum annealing that may be used in conjunction with the present systems and methods.

FIG. 5 is a schematic diagram of a portion of a superconducting quantum processor 500 designed for AQC (and/or quantum annealing) that may be used in conjunction with the present systems and methods. The portion of superconducting quantum processor 500 shown in FIG. 5 includes two superconducting qubits 501, 502 and a tunable ZZ-coupler 511 coupling information therebetween. While the portion of quantum processor 500 shown in FIG. 5 includes only two qubits 501, 502 and one coupler 511, those of skill in the art will appreciate that quantum processor 500 may include any number of qubits and any number of coupling devices coupling information therebetween.

The portion of quantum processor 500 shown in FIG. 5 may be implemented to physically realize AQC and/or QA by initializing the system with the Hamiltonian described by equation 2 and evolving the system to the Hamiltonian described by equation 3 in accordance with the evolution described by equation 1. Quantum processor 500 includes a plurality of programming interfaces 521-525 that are used to configure and control the state of quantum processor 500. Any or all of programming interfaces 521-525 may be realized by a respective inductive coupling structure, as illustrated, as part of, for example, a programming subsystem. Such a programming subsystem may be separate from quantum processor 500, or it may be included locally (i.e., on-chip with quantum processor 500) as described in U.S. Pat. No. 7,876,248 and U.S. Pat. No. 8,035,540.

In the operation of quantum processor 500, programming interfaces 521 and 524 may each be used to couple a flux signal into a respective compound Josephson junction ("CJJ") 531, 532 of qubits 501 and 502, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, programming interfaces 522 and 523 may each be used to couple a flux signal into a respective qubit loop of qubits 501 and 502, thereby realizing the $h_i$ terms in the system Hamiltonian. This coupling provides the diagonal $\sigma^z$ terms of equation 3. Furthermore, programming interface 525 may be used to couple a flux signal into coupler 511, thereby realizing the $J_{ij}$ terms in the system Hamiltonian. This coupling provides the diagonal $\sigma_i^z\sigma_j^z$ terms of equation 3. In FIG. 5, the contribution of each of programming interfaces 521-525 to the system Hamiltonian is indicated in boxes 521a-525a, respectively. Thus, throughout this specification and the appended claims, the terms "problem formulation" and "programming configuration" refer to, in some embodiments, a specific assignment of $h_i$ and $J_{ij}$ terms in the system Hamiltonian of the quantum processor.

Throughout this specification and the appended claims, the term "quantum processor" is used to generally describe, for example, a collection of physical qubits (e.g., qubits 501 and 502) and couplers (e.g., coupler 511). The physical qubits 501 and 502 and the couplers 511 are referred to as, for example, the "programmable elements" of the quantum processor 500. In the context of a quantum processor, the term "programming subsystem" is used to generally describe the programming interfaces (e.g., programming interfaces 522, 523, and 525) used to apply the $h_i$ and $J_{ij}$ terms to the programmable elements of the quantum processor (e.g., processor 500) and other associated control circuitry and/or instructions. As previously described, the programming interfaces of the programming subsystem may communicate with other subsystems which may be separate from the quantum processor or included locally on the processor. For example, the programming interfaces 522, 523, and 525 may communicate with at least one module in the set of modules operable to interact with a quantum processor 430 in digital computer 400 from FIG. 4. As described in more detail later, the programming subsystem may receive programming instructions in a machine language of the quantum processor and execute the programming instructions to program the programmable elements in accordance with the programming instructions. Similarly, in the context of a quantum processor, the term "evolution subsystem" is used to generally describe the programming interfaces (or, "evolution interfaces") 521, 524 used to evolve the programmable elements of the quantum processor 500 and other associated control circuitry and/or instructions. For example, the evolution subsystem may include annealing signal lines and their corresponding interfaces (521, 524) to the qubits (501, 502).

Quantum processor 500 also includes readout devices 541 and 542, where readout device 541 is operable to read out the state of qubit 501 and readout device 542 is operable to read out the state of qubit 502. In the embodiment shown in FIG. 5, each of readout devices 541 and 542 comprises a respective DC-SQUID that is operable to inductively couple to the corresponding qubit (qubits 501 and 502, respectively). In the context of quantum processor 500, the term "readout subsystem" is used to generally describe the readout devices 541, 542 used to read out the final states (e.g., the corresponding bit values) of the qubits (e.g., qubits 501 and 502) in the quantum processor to produce a bit string. The readout subsystem may also include other elements, such as routing circuitry (e.g., a shift register or a multiplexer circuit) and/or may be arranged in alternative configurations (e.g., an XY-addressable array, an XYZ-addressable array, etc.). Qubit readout may also be performed using alternative circuits, such as that described in PCT Patent Publication 2012-064974.

While FIG. 5 illustrates only two physical qubit bits 501, 502, one coupler 511, and two readout devices 541, 542, a quantum processor (e.g., processor 500) will typically employ a large number of qubits, couplers and readout devices. The application of the teachings herein to processors with a higher number of computational components should be readily apparent to those of ordinary skill in the art.

The various embodiments described herein provide systems and methods for formulating a combinatorial problem in a way that is amenable to being programmed into a quantum processor. Throughout this specification and the appended claims, the term "combinatorial problem" is used to describe any problem for which it is desirable to identify a particular permutation or permutations from a larger set of possible permutations. Examples of combinatorial problems include the travelling salesman problem, the graph isomorphism problem, the cyclic ordering problem, and the like, each of which is well known in the art.

In accordance with the present systems and methods, the search space of permutations for a combinatorial problem may be parameterized by using a modified sorting network to generate permutations. A sorting network may be modified to generate permutations by replacing each comparator with a controllable switch such that the output of the network depends on the configuration of the switches. Such a modified sorting network is referred to throughout this specification and the appended claims as a "permutation network." The switches in a permutation network may be similar to the comparators in a sorting network in that they may receive two inputs (e.g., drawn as wires) and they may provide two outputs (e.g., also drawn as wires), but the switches in a permutation network do not employ the comparison logic of the comparators in a sorting network. A switch in a permutation network may instead receive a third input called a "control" which controls which input to the switch maps to which output from the switch.

Figure 6:
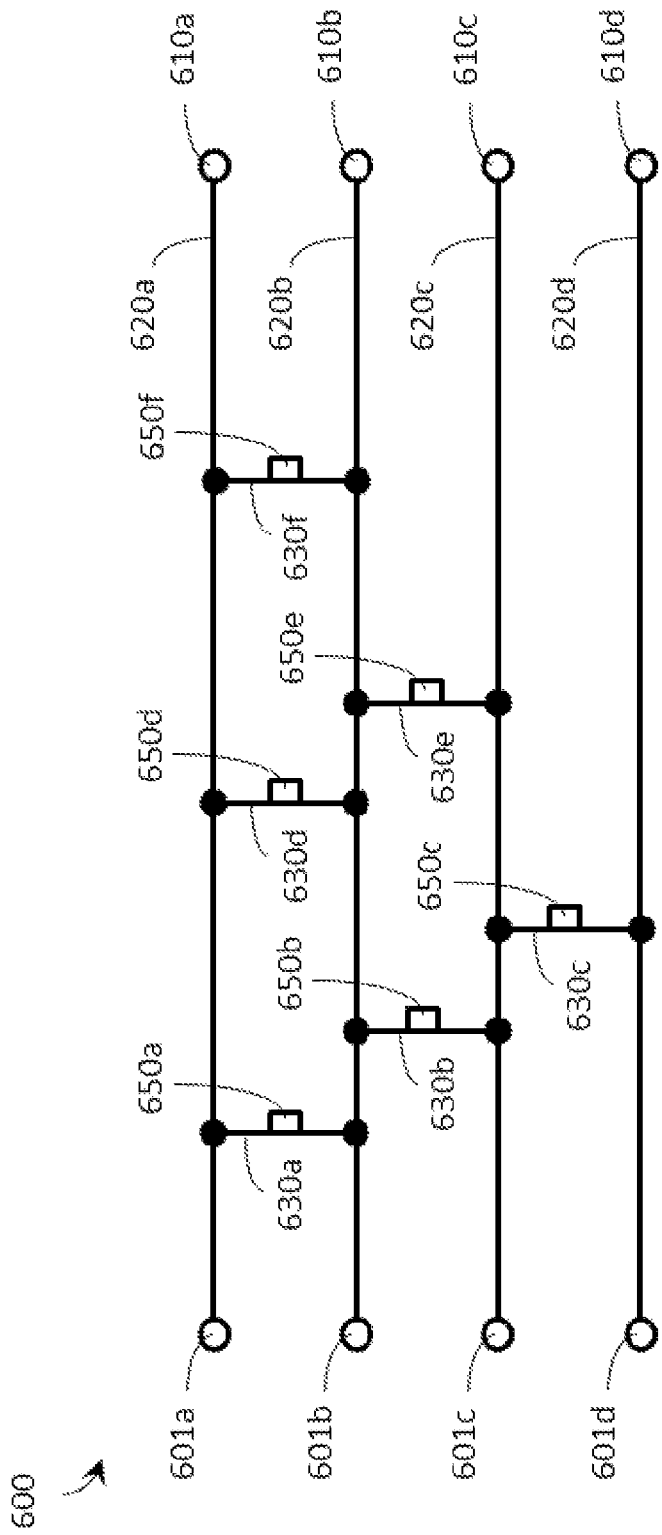
FIG. 6 is a schematic diagram of an embodiment of a permutation network having four inputs and four outputs in accordance with the present systems and methods.

FIG. 6 is a schematic diagram of an embodiment of a permutation network 600 having four inputs 601*a*-601*d* and four outputs 610*a*-610*d* in accordance with the present systems and methods. Each input 601*a*-601*d* is directly connected to a corresponding output 610*a*-610*d* through a respective wire 620*a*-620*d*, and permutation network 600 also includes six switches 630*a*-630*f*. Each of switches 630*a*-630*f* receives two inputs, provides two outputs, and also has a corresponding control input 650*a*-650*f* (respectively), the state of which determines how each switch's inputs map to its outputs. For example, switch 630*a* receives two inputs: one from 601*a* on wire 620*a* and one from 601*b* on wire 620*b*. Switch 630*a* is controlled by control input 650*a*. Control input 650*a* may, for example, turn switch 630*a* on or off. When control input 650*a* turns switch 630*a* on, the inputs from 601*a* and 601*b* switch such that the input from 601*a* is output on wire 620*b* and the input from 601*b* is output on wire 620*a*. When control input 650*a* turns switch 630*a* off, the inputs from 601*a* and 601*b* pass straight through switch 630*a* (i.e., they remain unswitched) such that the input from 601*a* is output on wire 620*a* and the input from 601*b* is output on wire 620*b*.

Figure 2:
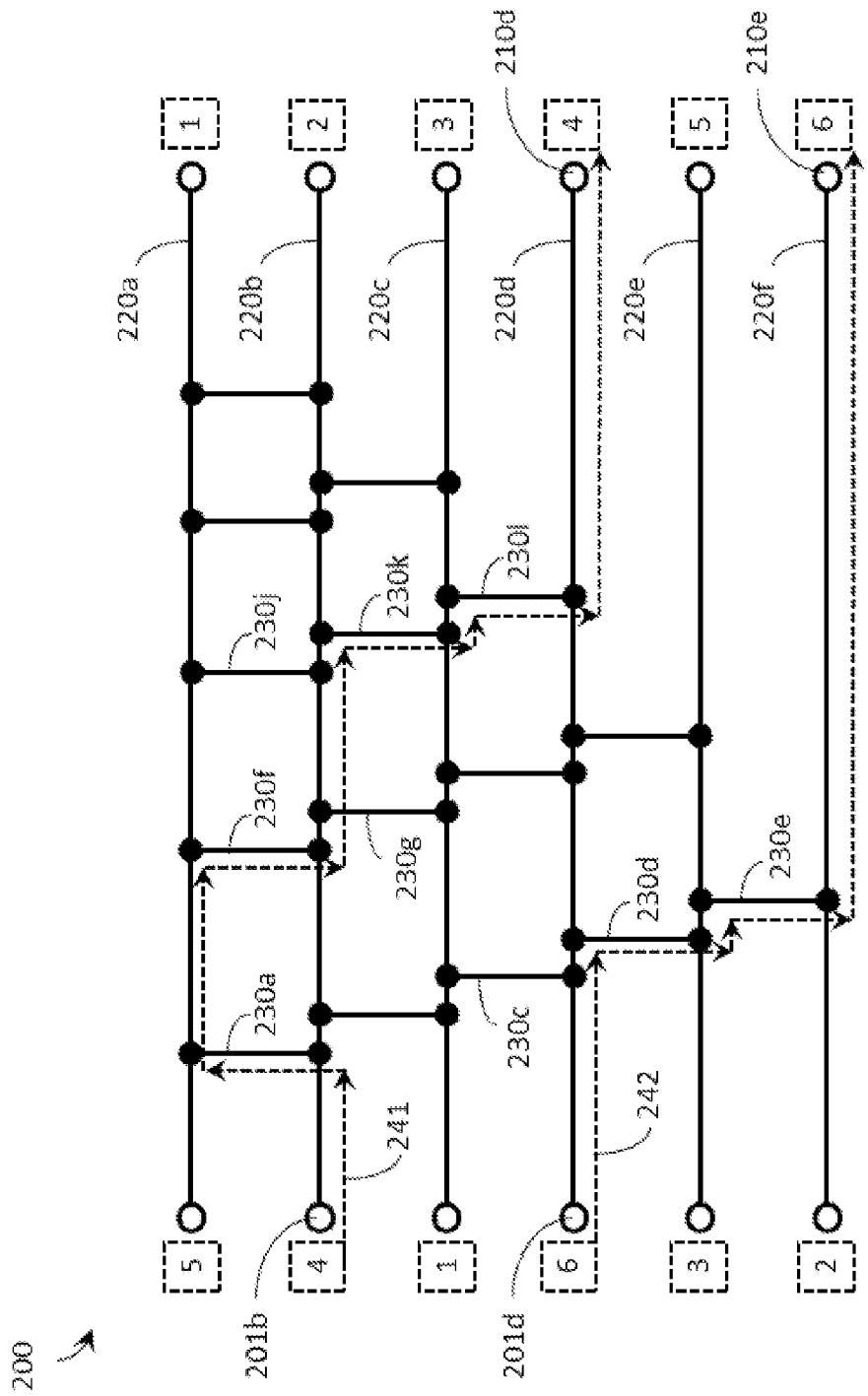
FIG. 2 is a schematic diagram of the same exemplary bubble sorting network from FIG. 1, showing exemplary paths taken by inputs through the network.
Figure 3B:
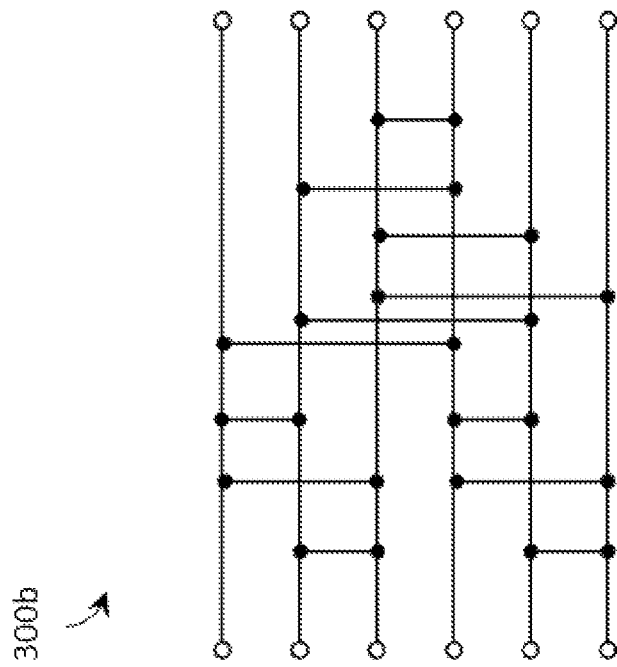
FIG. 3B is a schematic diagram of an example of a Bose-Nelson sorting network that employs parallel comparators.
Figure 3A:
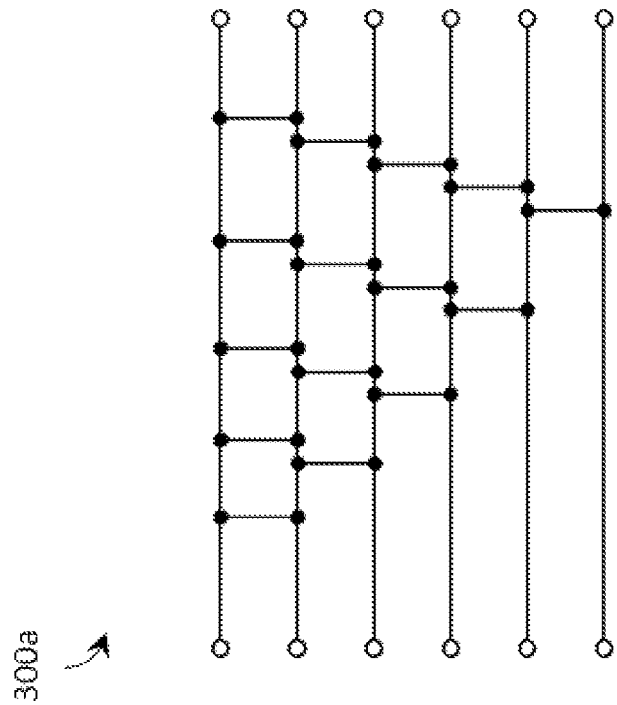
FIG. 3A is a schematic diagram of an example of an insertion sorting network, which uses the same comparators employed by the bubble sorting network but in the reverse order.
Figure 3D:
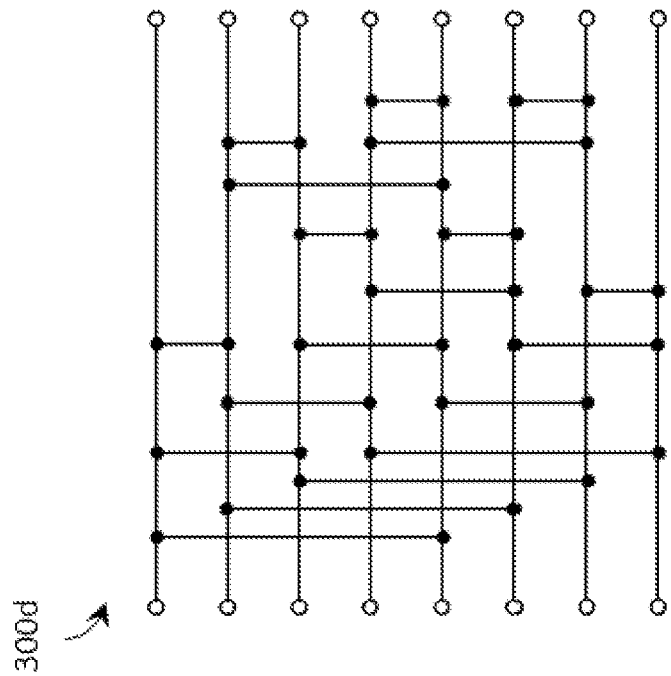
FIG. 3D is a schematic diagram of an exemplary Batcher's merge-exchange sorting network employing eight inputs.
Figure 3C:
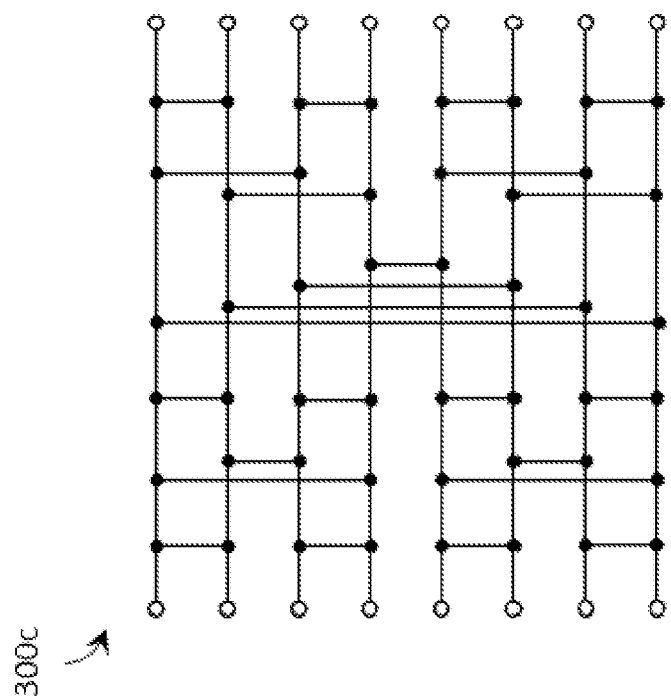
FIG. 3C is a schematic diagram of an exemplary bitonic sorting network employing eight inputs.

Permutation network 600 resembles a bubble sorting network (e.g., bubble sorting network 100 from FIG. 1) having four inputs/outputs, except the comparison logic of comparators 130*a*-130*o* in bubble sorting network 100 has been removed and, instead, each of switches 630*a*-630*f* controllably maps inputs to outputs based on the state of a corresponding control input 650*a*-650*f*, respectively. The configuration of switches 630*a*-630*f* and the states of control inputs 650*a*-650*f* affect the path each input follows through network 600 and, ultimately, determines the output to which each input will be routed. Similar to the description of sorting networks 100 and 200 from FIGS. 1 and 2, the term "path" is used to describe the route a given input takes through a permutation network. Thus, a "path" through a permutation network is made up of a specific input wire, a combination of switches that depends on the switch states, sections of wires corresponding to the outputs and inputs of successive switches, and a specific output wire.

Permutation network 600 employs a configuration of switches that matches the configuration of comparators in a bubble sorting network (e.g., bubble sorting network 100 from FIG. 1); however, permutation network 600 does not necessarily perform a sorting function because switches 630*a*-630*f* may operate independent of the relative magnitudes of their inputs. In other words, switches 630*a*-630*f* do not compare, so permutation network 600 does not necessarily sort. Instead, permutation network 600 can be used to generate permutations of inputs 601*a*-601*d* based on the configuration of switches 630*a*-630*f* and the states of control inputs 650*a*-650*f*. By arranging switches 630*a*-630*f* in a configuration that matches that of the comparators in a known sorting network, permutation network 600 is capable of generating all possible permutations of inputs 601*a*-601*d*.

A person of skill in the art will appreciate that permutation network 600 may be made to perform a sorting function by adding comparison logic that controls the values of the control inputs 650*a*-650*f* to switches 630*a*-630*f*. Furthermore, in accordance with the present systems and methods, a permutation network may be employed using any configuration of switches and any number of inputs/outputs. The "bubble sorting network" configuration of switches in permutation network 600 is used for illustrative purposes only and the configuration of switches in a permutation network may similarly be based on the configuration of comparators in any sorting network, including but not limited to an insertion sorting network, a bitonic sorting network, a Batcher's merge-exchange sorting network, a Bose-Nelson sorting network, a Hibbard sorting network, or a Batcher odd-even mergesort sorting network. As described above, modeling the configuration of switches in a permutation network after the configuration of comparators in a known sorting network may ensure that the permutation network is capable of generating all possible permutations, but in some applications it may be advantageous to employ a permutation network that is not modeled after a known sorting network.

In accordance with the present systems and methods, a permutation network may be used to formulate a combinatorial problem in a way that is amenable to being programmed into a quantum processor. Specifically, each of the control inputs (e.g., 650*a*-650*f*) that drive the switches (e.g., 630*a*-630*f*) in a permutation network (e.g., 600) may be driven by the state of at least one respective qubit in a quantum processor. Since the qubits in a quantum processor enter into superposition states, controlling the switches via qubit states means that the permutation network may represent all possible permutations at once.

As previously described, the present systems and methods are particularly well-suited for use in conjunction with the sampling approach to programming a quantum processor. In the sampling approach, an objective function may be defined that receives a bit string as an input and returns a real number as an output. In this case, the objective function may be crafted such that each permutation from a permutation network corresponds to a respective "sample": the bit string input to the objective function may correspond to a configuration of switches in the permutation network and the real number output by the objective function may provide a characteristic of the specific permutation that corresponds to the specific configuration of switches defined by the bit string. The quantum processor may be used to generate bit strings/samples (i.e., to generate permutations) by crafting the objective function so that each bit in the bit string corresponds to the state of at least one qubit in the quantum processor, and the state of at least one qubit in the quantum processor controls the state of at least one switch in a permutation network. For example, the state of each qubit in the quantum processor may control the state of a respective switch in a permutation network. The goal of this approach is then to use the quantum processor to generate a permutation that provides a desirable (e.g., minimum or maximum) real number output from the objective function.

For illustrative purposes, a brief example using the Travelling Salesman Problem is now described.

The Travelling Salesman Problem is the well-known problem of finding the shortest path that passes through a group of cities. As an example, consider four cities: Toronto, Kingston, Acton, and Guelph. In accordance with the present systems and methods, these four cities may be cast as four inputs V(1), V(2), V3) and V(4) to a permutation network. A quantum processor may be used to generate permutations of the four cities, where the order of the cities in the permutation corresponds to the order in which the cities are visited, thereby defining a path through the cities. The permutations may be plugged into an objective function (e.g., by a digital computer) that determines the length of the path and is minimized when the permutation of the four cities provides the shortest path. Using the sampling approach, the quantum processor may intrinsically explore all permutations at once and tend to return permutations that correspond to low-values (e.g., minima) of the objective function with high probability. The probability distribution of the quantum processor may be shaped in successive iterations to assign higher probability to permutations that correspond to low-values of the objective function. In this example, the permutation network employed is based on a bitonic sorting network.

Figure 7:
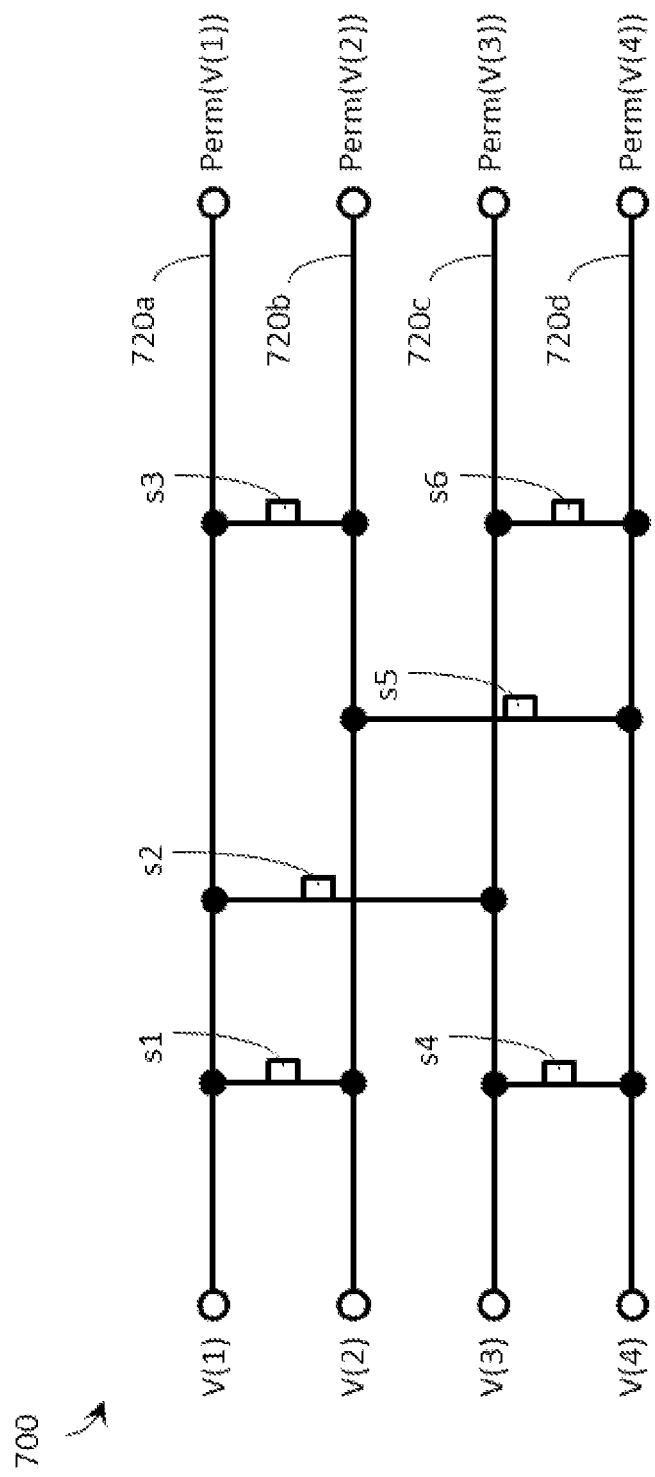
FIG. 7 is a schematic diagram of a permutation network based on a bitonic sorting network used in a Travelling Salesman Problem example of the present systems and methods.

FIG. 7 is a schematic diagram of a permutation network 700 based on a bitonic sorting network used in the Travelling Salesman Problem example, in accordance with the present systems and methods. Network 700 includes four inputs V(1), V(2), V(3), and V(4) that map to four outputs Perm(V(1)), Perm(V(2)), Perm(V(3)), and Perm(V(4)) through six switches s1-s6 along four wires 720a-720d. The configuration of switches s1-s6 matches that of a configuration of comparators for a bitonic sorting network having four inputs. Thus, the network may be described by six transformations:

[V(1) V(2)]=Flipper(s1, V(1), V(2));
[V(3) V(4)]=Flipper(s4, V(3), V(4));
[V(1) V(3)]=Flipper(s2, V(1), V(3));
[V(2) V(4)]=Flipper(s5, V(2), V(4));
[V(1) V(2)]=Flipper(s3, V(1), V(2));
[V(3) V(4)]=Flipper(s6, V(3), V(4));

In this way, the specific "bitonic" configuration of switches s1-s6 in permutation network 700 may be hard-coded into the problem formulation. The state of each switch s1-s6 (i.e., whether the switch is ON and causes the inputs to switch at the outputs or OFF and allows the inputs to pass through to the outputs unaffected) is represented by the state of a corresponding qubit. The Flipper function may be defined as:

```
function [o1 o2] = Flipper(s,i1,i2)
    if (s == 0)
        o1 = i1;
        o2 = i2;
    end
    if (s == 1)
        o1 = i2;
        o2 = i1;
    end
end
```

Where s==0 indicates the corresponding qubit is in a 0 state and s==1 indicates the corresponding qubit is in a 1 state. Thus, permutation network 700 may be characterized by six qubits in a quantum processor corresponding to the states of the six switches s1-s6. In the sampling approach to programming a quantum processor, the quantum processor may return bit strings (s1, s2, s3, s4, s5, s6) that provide permutations of these six qubits, where each permutation of the six qubits corresponds to a respective permutation of the four cities Toronto, Kingston, Acton, and Guelph. For example, the inputs may be (arbitrarily) defined as:

V(1)=Toronto;
V(2)=Kingston;
V(3)=Acton; and
V(4)=Guelph.

In which case a bit string of (0,1,1,0,1,0) corresponds to switches s1, s4, and s6 all being OFF and switches s2, s3, and s5 all being ON and produces the permutation: Perm(V(1))=V(4), Perm(V(2))=V(3), Perm(V(3))=V(1), and Perm(V(4))=V(2), representing the path: Guelph, Acton, Toronto, Kingston. This path may then be plugged into the objective function that outputs its length by a digital computer. For example, a digital computer may store a look-up table that provides the distance between each pair of the four cities. For example, D(Toronto, Kingston)=260 km; D(Kingston, Acton)=315 km, etc. The objective function to be minimized may, for example, be defined as:

PathLength($s1,s2,s3,s4,s5,s6$)=D(Perm(V(1)), Perm(V(2)))+D(Perm(V(2)),Perm(V(3)))+ D(Perm(V(3)),Perm(V(4)))+D(Perm(V(4)), Perm(V(1)))

The sampling approach to programming the quantum processor may, for example, focus on shaping the probability distribution of the quantum processor such that it is energetically favorable (and therefore more probable) for the quantum processor to return permutations that correspond to low-values of the objective function.

Throughout this specification and the appended claims, the problem being solved is often described in relation to an objective function and, in particular, to the minimization of an objective function. In this context, the term "low-value" is often used to describe a value of an objective function. An ideal outcome of the various embodiments described herein may be, for example, the identification of a minimum or "lowest" value of an objective function; however, the nature of many combinatorial problems is such that the minimum/lowest value of the objective function may not be known. Accordingly, a "low-value" is a value of an objective function that is at least lower than an average value of the objective function. For example, if a value corresponding to every permutation is determined, then a low-value may be lower than at least half of all of the other values. In some embodiments, a low-value may be lower than 75% of all of the other values, and/or lower than 90% of all of the other values. A low-value may, for example, correspond to the global minimum of the objective function, or it may correspond to a local minimum of the objective function.

The Travelling Salesman Problem example given above, and more generally the various embodiments described herein, may be generalized as a method for solving combinatorial optimization problems.

Figure 8:
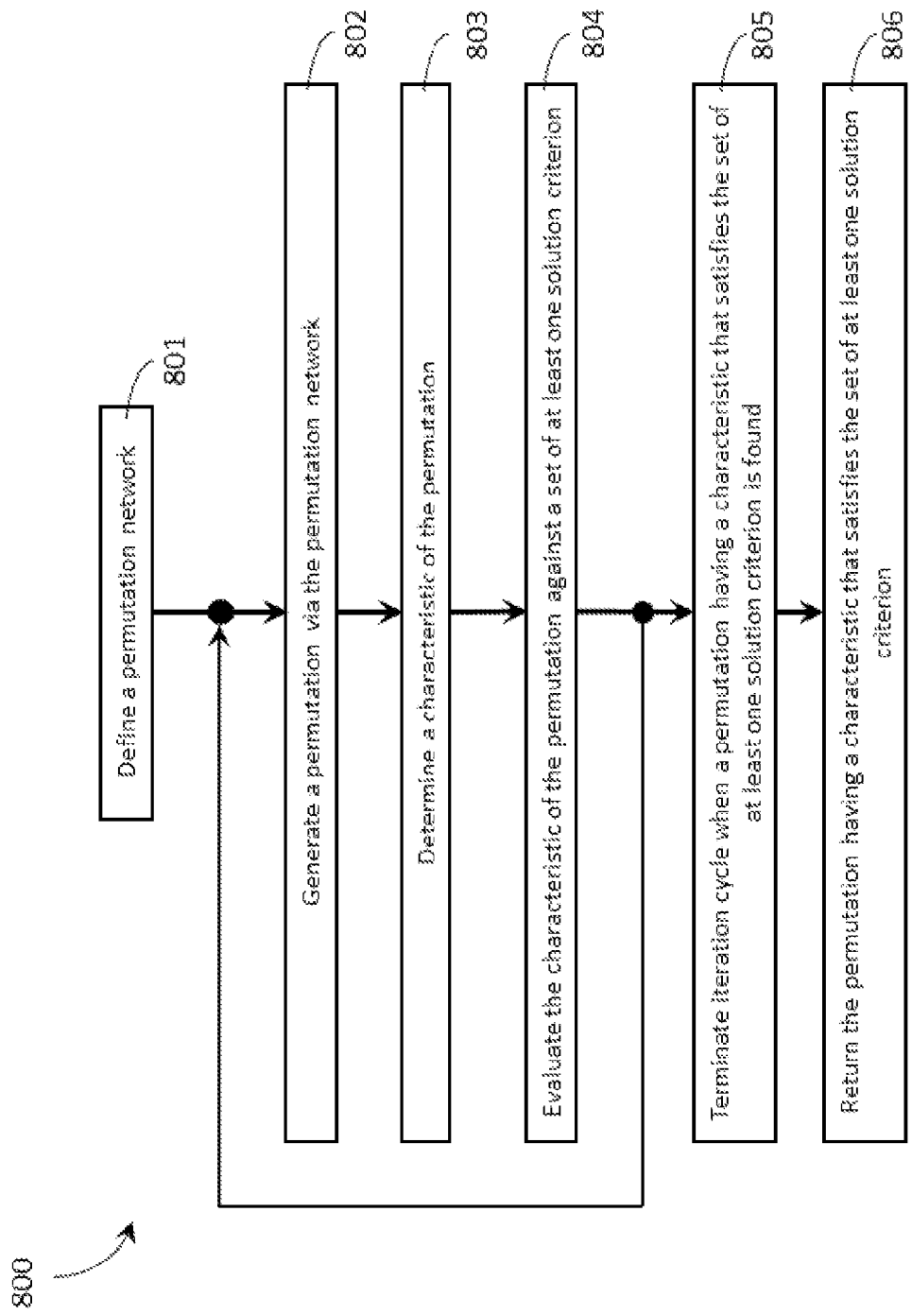
FIG. 8 is a flow-diagram of an embodiment of a method for solving a combinatorial problem in accordance with the present systems and methods.

FIG. 8 is a flow-diagram of an embodiment of a method 800 for solving a combinatorial problem in accordance with the present systems and methods. Method 800 includes six acts 801-806, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. At 801, a permutation network is defined. The permutation network may be defined by a digital computer (e.g., digital computer 400 from FIG. 4) and may include a number of inputs, a number of outputs, a set of switches, and a set of paths where each path maps a respective input to a respective output through a respective combination of switches such that each input respectively maps to each of the outputs through a respective path. As previously described, the permutation network may be based on or modeled after a sorting network. Thus, defining a permutation network may include, for example, defining a sorting network by the digital computer, where the sorting network comprises a number of inputs, a number of outputs, a set of comparators, and a set of paths, and programmatically replacing each comparator in the set of comparators with a respective switch by the digital computer. Exemplary sorting networks that may be used include: a bubble sorting network, an insertion sorting network, a bitonic sorting network, a Batcher's merge-exchange sorting network, a Bose-Nelson sorting network, a Hibbard sorting network, or a Batcher odd-even mergesort sorting network; though a person of skill in the art will appreciate that a permutation network may be based on any sorting network or not based on a sorting network at all.

At 802, a permutation is generated by the permutation network. The permutation may be generated, for example, by the digital computer (e.g., by digital computer 400 from FIG. 4) or by a quantum processor, such as quantum processor 500, from FIG. 5. In applications where the permutation is generated by a quantum processor, generating a permutation by the permutation network may include mapping the permutation network from the digital computer to the quantum processor and generating a permutation by the quantum processor. Mapping the permutation network from the digital computer to the quantum processor may include programming the quantum processor with an objective function, where the objective function assigns a respective energy to each configuration of switches in the permutation network. As previously described, this mapping may be achieved via different approaches, including the direct mapping approach and the sampling approach. Via the direct mapping approach, the objective function may comprise a QUBO problem that encodes the permutation network and/or assigns a respective energy to each configuration of switches in the permutation network. Via the sampling approach, the objective function may produce a probability distribution that assigns a respective energy to each configuration of switches in the permutation network, where high probability states correspond to low energy switch configurations. For example, the highest probability state may ideally correspond to the ground state energy configuration of the quantum processor. Once the permutation network has been mapped to the quantum processor, the quantum processor may be evolved to determine a configuration of switches in the permutation network. As previously described, evolving the quantum processor may include performing at least one of adiabatic quantum computation or quantum annealing by the quantum processor. After the evolution, the states of the qubits in the quantum processor may be read out to provide a bit string representing the permutation.

At 803, a characteristic of the permutation is determined. The characteristic may be determined, for example, by the digital computer. The characteristic may include, for example, a property of the permutation which it is desirable to optimize. In the case of the exemplary Travelling Salesman Problem described above, the permutation is the order of the cities (which defines a path through the cities) and is output as a bit string from the quantum processor, and the characteristic is the length of the path and is calculated by a digital computer using the bit string form the quantum processor.

At 804, the characteristic of the permutation is evaluated against a set of at least one solution criterion. The evaluation may be performed, for example, by the digital computer and the set of at least one solution criterion may include, for example: a minimum allowed value of the characteristic, a maximum allowed value of the characteristic, a minimum allowed computation time, or a maximum allowed computation time. In response to the characteristic of the permutation not satisfying the set of at least one solution criterion, the acts of generating a permutation (802), determining a characteristic of the permutation (803), and evaluating the characteristic of the permutation (804) may be repeated (i.e., re-iterated) until the set of at least one solution criterion is satisfied. Thus, the set of at least one solution criterion may also include a minimum allowed number of iterations (i.e., a minimum allowed number of permutations generated and characteristics evaluated), or a maximum allowed number of iterations.

At 805, the iteration cycle is terminated when a permutation having a characteristic that satisfies the set of at least one solution criterion is found. Depending on the specific application, "satisfying the set of at least one solution criterion" may mean satisfying at least one solution criterion from a set of multiple solution criteria, or satisfying a lone solution criterion, or satisfying multiple solution criteria.

At 806, the permutation having a characteristic that satisfies the set of at least one solution criterion is returned by, for example, the digital computer.

As previously indicated, the various embodiments described herein may or may not involve a quantum processor or quantum processing techniques. For example, act 802 from method 800 may employ a quantum processor to generate a permutation by the permutation network, or may employ a digital computer to generate a permutation by the permutation network. However, in accordance with the present systems and methods, employing a quantum processor to generate a permutation by the permutation network may be advantageous in some applications because a quantum processor may be intrinsically more likely to generate a permutation that corresponds to a low-value of the corresponding objective function. In particular, a quantum processor performing adiabatic quantum computation and/or quantum annealing may be intrinsically more likely to generate a permutation that corresponds to a low-value of the corresponding objective function because, as previously described, adiabatic quantum computation and quantum annealing are both quantum algorithms that seek low-energy configurations of the quantum processor. Applications that employ a quantum processor may, for example, employ a system that solves combinatorial problems.

Figure 9:
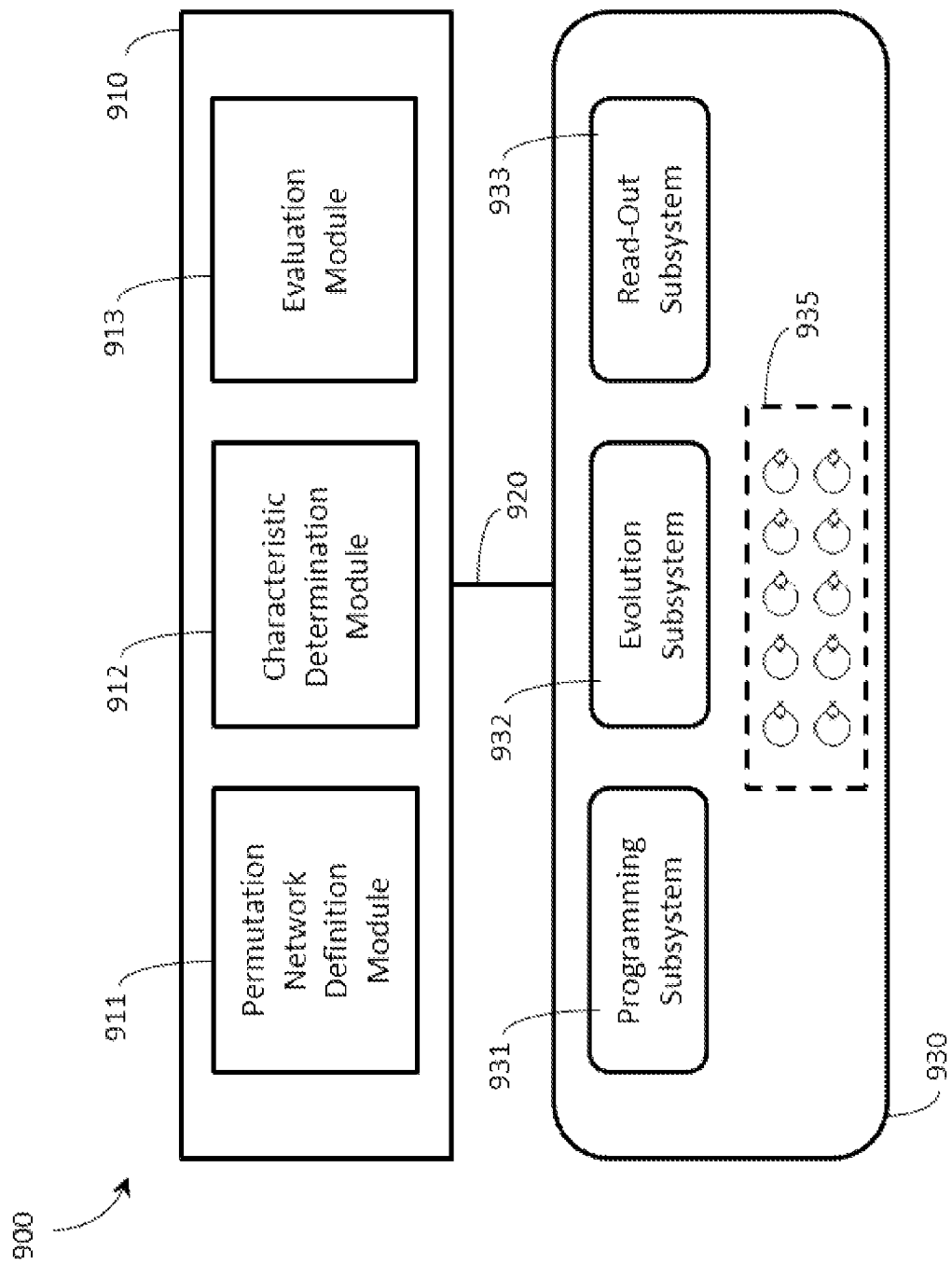
FIG. 9 is an illustrative schematic diagram of an exemplary computational solver system for solving problems in accordance with the present systems and methods.

FIG. 9 illustrates an exemplary computational solver system 900 for solving problems in accordance with the present systems and methods. System 900 includes a digital computer 910 that, at least, defines a permutation network, determines a characteristic of a permutation, and evaluates the characteristic of the permutation. Digital computer 910 may, for example, be substantially similar to digital computer 400 from FIG. 4. Digital computer 910 includes at least three software modules stored in, for example, non-volatile memory: permutation network definition module 911, characteristic determination module 912, and evaluation module 913. Permutation network definition module 911 may define a permutation network (e.g., permutation network 600 from FIG. 6) for generating permutations; characteristic determination module 912 may determine a characteristic of each permutation generated; and evaluation module 913 may evaluate the characteristic of the permutation against a set of at least one solution criterion. Digital computer 910 is in communication with a quantum processor 930 via a communication interface 920. Communication interface 920 may include, for example, a direct electrical connection (e.g., via Universal Serial Bus, Firewire, or the like), a wireless connection (e.g., via a Wi-Fi® network), or an Internet connection. Quantum processor 930 may, for example, be substantially similar to quantum processor 500 from FIG. 5. Quantum processor 930 uses a permutation network defined by permutation network definition module 911 to generate permutations. Quantum processor 930 includes a plurality of qubits 935 (called out collectively in FIG. 9) and at least three subsystems: programming subsystem 931, evolution subsystem 932, and read-out subsystem 933. Programming subsystem 931 may program quantum processor 930 with an objective function that assigns a respective energy to each configuration of switches in a permutation network based on, for example, programming instructions from permutation network definition module 911; evolution subsystem 932 may evolve quantum processor 930 to determine a configuration of switches in a permutation network; and read-out subsystem 933 may read out a state of each qubit in the plurality of qubits 935 and, for example, return the resulting bit string to characteristic determination module 912. In other words, at least permutation network definition module 911 may send programming instructions to quantum processor 930 (i.e., to programming subsystem 931) and may, therefore, be included in the set of modules for interacting with a quantum processor 430 in digital computer 400 from FIG. 4. Similarly, at least characteristic determination module 912 may receive bit strings from quantum processor 930 (i.e., from readout subsystem 933) and may, therefore, be included in the set of modules for interacting with a quantum processor 430 in digital computer 400 from FIG. 4.

Quantum processor 930 may, for example, include a superconducting quantum processor and superconducting qubits. The plurality of qubits 935 in FIG. 9 is used for illustrative purposes only. A person of skill in the art will appreciate that any type, number, and arrangements may be implemented in accordance with the present systems and methods depending on the specific problem being solved.

As previously described, many different approaches may be implemented to program a quantum processor to generate permutations (e.g., at act 802 of method 800). An example of the sampling approach has been described, but the direct mapping approach to programming a quantum processor may similarly be employed. In the direct mapping approach, a user may, for example, treat a permutation network as a digital circuit and adopt the teachings of, e.g., US Patent Application Publication No. 2011-0231462 to define a respective miniature optimization problem corresponding to each switch in the permutation network, where each miniature optimization problem is optimized (e.g., minimized) when its corresponding truth table is obeyed.

The present systems and methods describe replacing the comparators in sorting networks with qubit-driven switches (i.e., switches whose switch state directly depends on at least one qubit state) in order to operate the sorting network as a permutation network for generating permutations in solving a combinatorial problem. Using a qubit to drive the state of a switch may enable all permutations to be explored simultaneously during a quantum computation. Furthermore, by removing the comparison logic from a comparator and operating the comparator as a switch, a switch can still provide two outputs even if it only receives one input. A permutation network can, therefore, be extended to include a number of outputs that is greater than the number of inputs such that the permutation network also serves as a selection network. In this way, the permutation network may be used to select a subset of outputs from a larger set of available outputs, effectively implementing an nCk (or, "n choose k") operation. In other words, generating a permutation by the permutation network (e.g., act 802 from method 800) may include mapping each input to the permutation network to a respective output from the permutation network, where the number of potential outputs is greater than the number of inputs such that only a subset of the outputs from the permutation network are actually used.

Figure 10:
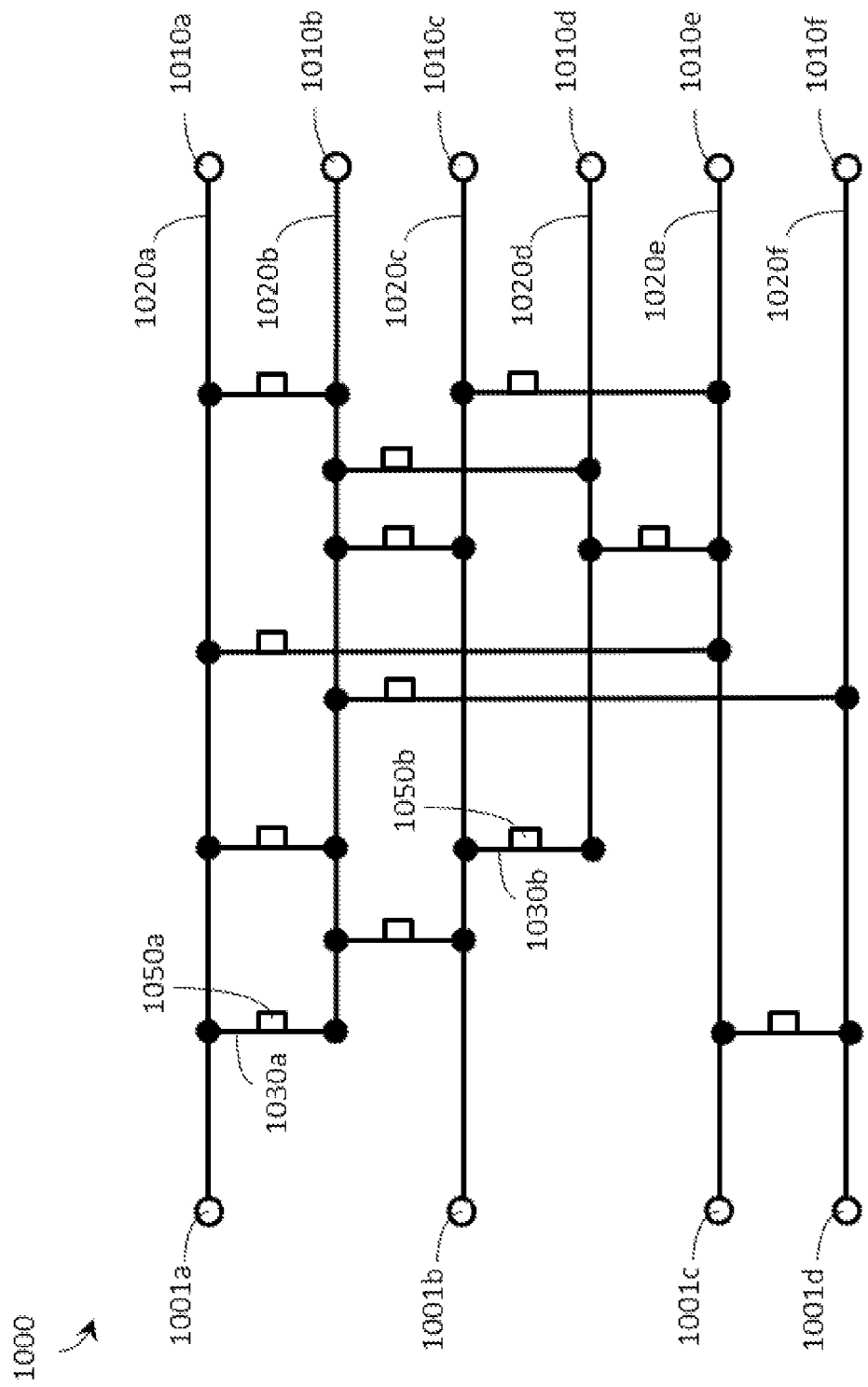
FIG. 10 is a schematic diagram of an exemplary permutation network that may be operated as a selection network to perform an nCk function in accordance with the present systems and methods.

FIG. 10 is a schematic diagram of an exemplary permutation network 1000 that may be operated as a selection network to perform an nCk function in accordance with the present systems and methods. Network 1000 includes four inputs 1001a-1001d that may be mapped to any four of six outputs 1010a-1010f along six wires 1020a-1020f. Network 1000 also includes a plurality of switches (e.g., 1030a and 1030b; only two called out in FIG. 10 for clarity of illustration) each of which is controlled by a respective control input (e.g., 1050a and 1050b; only two called out in FIG. 10 for clarity of illustration). The configuration of switches (e.g., 1030a, 1030b) in network 1000 is used for illustrative purposes only while any alternative configuration of switches (and any number of switches) may be employed depending on the specific application. Indeed, the configuration of switches in network 1000 is random and not based on any specific sorting network, although in alternative networks the configuration of switches may be based on a known sorting network as previously described. Network 1000 is operable to produce permutations of inputs 1001a-1001d at outputs 1010a-1010f in a way similar to that described for networks 600 and 700; however, network 1000 is also operable to select a subset of four outputs out of the six available outputs 1010a-1010f. Network 1000 has this added capability (compared to networks 600 and 700) because network 1000 includes switches 1030a and 1030b, each of which receives a single wire as input (e.g., wire 1020a and wire 1020c, respectively) but provides its output on one of two wires (e.g., 1020a/1020b and 1020c/1020d, respectively) depending on the state of the corresponding control input. Control input 1050a controls switch 1030a and control input 1050b controls switch 1030b. As previously described, each switch in network 1000 may be controlled by the state of a corresponding qubit to enable network 1000 to explore all permutations of inputs 1001a-1001d across all combinations of outputs 1010a-1010f.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a computational solver system to solve a problem, the method comprising:
   defining an objective function by a digital computer, the objective function operable to receive a bit string as an input and produce a real number as an output;
   defining a permutation network by a digital computer, wherein the permutation network comprises a plurality of inputs, a plurality of outputs, a plurality of switches, and a plurality of paths, and wherein each path maps a respective input to a respective output through a respective combination of switches;
   mapping the permutation network from the digital computer to a quantum processor, the quantum processor which comprises a plurality of qubits, wherein mapping the permutation network from the digital computer to a quantum processor includes controlling the state of at least one switch in the permutation network by the state of at least one qubit of the plurality of qubits;
   generating a permutation from the permutation network by the quantum processor, wherein the permutation corresponds to a configuration of at least one of the plurality of switches that produces an arrangement of at least one of the plurality of outputs;
   returning the permutation by the quantum processor to the digital computer, wherein returning the permutation by the quantum processor to the digital computer includes reading out the state of the at least one qubit in the plurality of qubits;
   determining a characteristic of the permutation by the digital computer by evaluating the objective function using the permutation as the input to produce a result comprising a real number as the output, wherein the characteristic of the permutation is based at least in part on the result;
   evaluating the characteristic of the permutation against a set of at least one solution criterion by the digital computer; and
   in response to the characteristic of the permutation not satisfying the set of at least one solution criterion, repeating the generating a permutation, determining a characteristic of the permutation, and evaluating the characteristic of the permutation until the set of at least one solution criterion is satisfied.

2. The method of claim 1 wherein the quantum processor includes a programming subsystem and an evolution subsystem, and wherein:
   mapping the permutation network from the digital computer to the quantum processor includes programming the quantum processor by the programming subsystem, wherein programming the quantum processor includes assigning a respective energy to each configuration of switches in the permutation network; and
   generating a permutation by the quantum processor includes evolving the quantum processor by the evolution subsystem to determine a configuration of switches in the permutation network.

3. The method of claim 2 wherein evolving the quantum processor by the evolution subsystem to determine a configuration of switches in the permutation network includes evolving the quantum processor by the evolution subsystem to determine a specific configuration of switches in the permutation network that corresponds to a low-value of the objective function.

4. The method of claim 3 wherein evolving the quantum processor by the evolution subsystem to determine a specific configuration of switches in the permutation network that corresponds to a low-value of the objective function includes evolving the quantum processor by the evolution subsystem to determine a specific configuration of switches in the permutation network that corresponds to a ground state value of the objective function.

5. The method of claim 2 wherein evolving the quantum processor by the evolution subsystem to determine a configuration of switches in the permutation network includes performing at least one of adiabatic quantum computation and/or quantum annealing by the quantum processor.

6. The method of claim 2 wherein repeating the generating a permutation, determining a characteristic of the permutation, and evaluating the characteristic of the permutation until the set of at least one solution criterion is satisfied includes iteratively shaping a probability distribution of the quantum processor until a permutation that satisfies the set of at least one solution criterion is found.

7. The method of claim 1 wherein the problem includes a combinatorial optimization problem.

8. The method of claim 1 wherein evaluating the characteristic of the permutation against a set of at least one solution criterion by the digital computer includes evaluating whether or not the value of the objective function that corresponds to the permutation satisfies the set of at least one solution criterion by the digital computer.

9. The method of claim 8 wherein evaluating whether or not the value of the objective function that corresponds to the permutation satisfies the set of at least one solution criterion by the digital computer includes evaluating whether or not the value of the objective function that corresponds to the permutation satisfies at least one of: a minimum allowed value, a maximum allowed value, a minimum allowed computation time, a maximum allowed computation time, a minimum allowed number of iterations, or a maximum allowed number of iterations.

10. The method of claim 1 wherein defining a permutation network by the digital computer comprises:

defining a sorting network by the digital computer, wherein the sorting network comprises a number of inputs, a number of outputs, a set of comparators, and a set of paths, and wherein each path maps a respective input to a respective output through a respective combination of comparators such that each input respectively maps to each of the outputs through a respective path; and programmatically replacing each comparator in the set of comparators with a respective switch by the digital computer.

11. The method of claim 10 wherein the sorting network includes at least one of: a bubble sorting network, an insertion sorting network, a bitonic sorting network, a Batcher's merge-exchange sorting network, a Bose-Nelson sorting network, a Hibbard sorting network, or a Batcher odd-even mergesort sorting network.

12. The method of claim 1 wherein defining a permutation network by the digital computer includes defining a permutation network wherein the number of outputs is greater than the number of inputs by the digital computer.

13. The method of claim 12 wherein generating a permutation by the permutation network includes mapping each input to a respective output by the permutation network.

14. The method of claim 13 wherein mapping each input to a respective output by the permutation network includes determining a configuration of the switches of the permutation that maps each input to a respective output.

15. The method of claim 1 wherein each input is selectively mappable to each of the outputs through a respective path.

16. A computational solver system for solving problems, the computational solver system comprising:

a digital computer that:

defines an objective function by a digital computer, the objective function operable to receive a bit string as an input and produce a real number as an output;

defines a permutation network for generating permutations by a permutation network definition module, wherein the permutation network comprises a plurality of inputs, a plurality of outputs, a plurality of switches, and a plurality of paths, and wherein each path maps a respective input to a respective output through a respective combination of switches such that each input respectively maps to each of the outputs through a respective path;

determines a characteristic of each permutation generated by the permutation network by a characteristic determination module; and evaluates the characteristic of the permutation against a set of at least one solution criterion by an evaluation module; and a quantum processor in communication with the digital computer, the quantum processor comprising a plurality of qubits, wherein the computational solver system maps the permutation network from the digital computer to the quantum processor, wherein the state of at least one switch in the permutation network is controlled by the state of at least one qubit of the plurality of qubits, and generates permutations by the quantum processor, and wherein each permutation corresponds to a configuration of the switches that produces an arrangement of the outputs.

17. The computational solver system of claim 16 wherein the quantum processor includes a superconducting quantum processor comprising superconducting qubits.

18. The computational solver system of claim 16 wherein the quantum processor includes at least one of a processor that performs adiabatic quantum computation and/or a processor that performs quantum annealing.

19. The system of claim 16 wherein the quantum processor comprises:

a plurality of qubits;

a programming subsystem that programs the quantum processor by assigning a respective energy to each configuration of switches in the permutation network;

an evolution subsystem that evolves the quantum processor to determine a configuration of switches in the permutation network; and a read-out subsystem that reads out a state of each qubit in the plurality of qubits.

\* \* \* \* \*